United States Patent
Liang et al.

(10) Patent No.: US 6,766,355 B2
(45) Date of Patent: *Jul. 20, 2004

(54) METHOD AND APPARATUS FOR IMPLEMENTING MULTI-USER GROUPING NODES IN A MULTIMEDIA PLAYER

(75) Inventors: Tao Liang, Sunnyvale, CA (US); Sadik Bayrakeri, Foster City, CA (US); Jing Swales, Sunnyvale, CA (US)

(73) Assignees: Sony Corporation, Tokyo (JP); Sony Electronics, Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,100

(22) Filed: Oct. 21, 1998

(65) Prior Publication Data

US 2002/0133546 A1 Sep. 19, 2002

Related U.S. Application Data

(60) Provisional application No. 60/091,122, filed on Jun. 29, 1998.

(51) Int. Cl.[7] ............................................. G06F 15/16
(52) U.S. Cl. ...................................... 709/204; 709/231
(58) Field of Search ........................ 709/200, 201–203, 709/213–214, 217–219, 228–229, 231, 204

(56) References Cited

U.S. PATENT DOCUMENTS

| | | | | |
|---|---|---|---|---|
| 5,884,325 A | * | 3/1999 | Bauer et al. ................ 707/201 |
| 5,896,128 A | * | 4/1999 | Boyer ........................ 345/327 |
| 5,907,704 A | * | 5/1999 | Gudmundson et al. ........ 717/1 |
| 5,940,082 A | * | 8/1999 | Brinegar et al. ............ 345/442 |
| 5,941,947 A | * | 8/1999 | Brown et al. ................ 709/225 |
| 6,052,688 A | * | 4/2000 | Thorsen ...................... 707/100 |
| 6,079,566 A | * | 6/2000 | Eleftheriadis et al. ...... 707/101 |
| 6,094,673 A | * | 7/2000 | Dilip et al. ................. 709/202 |
| 6,128,652 A | * | 10/2000 | Toh et al. .................... 709/219 |
| 6,295,551 B1 | * | 9/2001 | Roberts et al. ............. 709/205 |
| 6,330,593 B1 | * | 12/2001 | Roberts et al. ............. 709/217 |

OTHER PUBLICATIONS

Mulroy, "VRML Gets Real The MPEG–4 Way", IEEE, 1997.*

(List continued on next page.)

Primary Examiner—Hosain Alam
Assistant Examiner—Philip B. Tran
(74) Attorney, Agent, or Firm—Valley Oak Law

(57) ABSTRACT

Methods and apparatus are provided for multi-user communication of multimedia content including dividing a client's scene into a non-shared and shared parts. In a disclosed embodiment, the non-shared parts of a scene may be organized into one or more single-user nodes with which other clients cannot interact. The shared parts of the scene are organized into one or more multi-user group nodes. These multi-user group nodes enable multiple clients to access the same scene and to interact with its shared content. Each multi-user group node is an extension of a Group node. In addition to the functionality provided by a single-user group node, a multi-user group node wraps its children with control mechanisms required for supporting multi-user communication. These control mechanisms may be provided as boolean exposed fields that act as switches to control initiation of interaction, update control, privacy, and object accessibility. A client's scene may have multiple multi-user group nodes represented in hierarchical order or each representing a different part of a shared scene.

12 Claims, 10 Drawing Sheets-

OTHER PUBLICATIONS

Heijenk et al, "Communication Systems Supporting Multimedia Multi-user Applications", IEEE, 1994.*

Text: "The Annotated VRML 2.0 Reference Manual," by Rikk Carey and Gavin Bell, Addison–Wesley Developers Press, 1997, title page, reference/disclosure page, and pp. 183–184.

Document: "Living Worlds", visited at Internet web-site www.livingworlds.com on Jan. 19, 1998.

Document: Eleftheriadis et al., Test for CD 14496–1 Systems, ISO/IEC JTC1/SC29/WG11 N1901, Nov. 21, 1997.

Document: Koenen, MPEG–4 Overview—(Dublin Version), ISO/IEC JTC1/SC29/WG11 N2323, Jul. 1998, Dublin.

Document: Vaananen, Working Draft of Advanced BIFS (Systems WD subpart 2), ISO/IEC JTC1/SC29/WG11 MPEG98/N2358 subpart 2, Jul. 1998.

Document: Vaananen, Verification Model of Advanced BIFS (Systems VM subpart 2), ISO/IEC JTC1/SC29/WG11 MPEG98/N2359 subpart 2, Jul. 1998.

* cited by examiner

US 6,766,355 B2

METHOD AND APPARATUS FOR IMPLEMENTING MULTI-USER GROUPING NODES IN A MULTIMEDIA PLAYER

RELATED APPLICATIONS

The following identified U.S. Patent applications related to this application:

Provisional U.S. Patent Application No. 60/091,122, entitled "Multi-User Interaction Protocol Using Java and MPEG-4," filed on Jun. 29, 1998 by Sadik Bayrakeri;

U.S. patent application Ser. No. 09/173,987, entitled "MULTI-USER INTERACTION FOR MULTIMEDIA COMMUNICATION," filed on Oct. 16, 1998 by Sadik Bayrakeri; and U.S. patent application Ser. No. 09/176,101, entitled "MULTI-USER EXTENSION MECHANISMS FOR CLIENT-SERVER SYSTEM," and filed on the same date herewith by Sadik Bayrakeri and Chuen-Chien Lee.

The disclosures of these applications are each expressly incorporated herein by reference in their entirety. In addition, the benefit of priority of Provisional U.S. patent application Ser. No. 60/091,122 is hereby claimed under 35 U.S.C. 119(e).

BACKGROUND OF THE INVENTION

A. Field of the Invention

This invention relates generally to multi-user communication, and, more particularly, to a multimedia player implementing multi-user grouping nodes.

B. Description of the Related Art

The Moving Picture Experts Group (MPEG) is a working group of the International Organization for Standardization (ISO)that generates standards for digital audio and video compression. MPEG-1 and MPEG-2 are standards for interactive video on CD-ROM and Digital Television, respectively. MPEG-4 is a developing standard designed for efficient multimedia delivery and integration between a client and a server. MPEG-4 provides the flexibility to allow an end user to interact with multimedia content and to control the way that audiovisual objects are displayed. MPEG-4 is described more completely in the documents ISO/IEC JTC1/SC29/WG11, N1901, published Nov. 21, 1997, by the International Organization for Standardization (ISO) and ISO/IEC JTC1/SC29/WG11, N2323, published Jul. 1998, by the ISO.

MPEG-4 incorporates aspects of Virtual Reality Modeling Language (VRML), which describes three dimensional objects and worlds using a hierarchical scene graph (or scene description).[1] Entities contained within the scene graph are called nodes. VRML 2.0 defines 54 different node types, including geometry primitives, appearance properties, sound properties, and various types of grouping nodes. Nodes store their data in fields, and VRML defines 20 different types of fields. Furthermore, nodes can contain other nodes and may be contained in more than one node. These nodes are processed by multimedia players using computer software to generate multimedia displays based on the scene graph.

[1] The terms "scene graph" and "scene description" are used interchangeably herein. VRML is described more fully in various texts, such as "The Annotated VRML 2.0 Reference Manual," by Rikk Carey and Gavin Bell, Addison-Wesley Developers Press (1997).

Two of the node types defined in VRML 2.0 and MPEG-4 are the Group and the Group2D nodes. Both the Group and Group2D nodes are mechanisms by which one associates different media objects into a scene description. One limitation of VRML and MPEG-4 is that these Group and Group2D nodes are designed for a single end user, and therefore do not provide mechanisms for multi-user interaction. Multi-user interaction, however, is important for application domains such as collaborative computing, distance learning, shared virtual worlds, virtual chat, entertainment, and e-commerce, each of which involve interaction of two or more users with each other. There exists, therefore, a need for multimedia players providing multiple user interaction via a computer system.

SUMMARY OF THE INVENTION

Methods and apparatus consistent with the present invention, as embodied and broadly described herein, provide a multimedia player implementing multi-user communication via a computer system.

Consistent with the invention, a method for providing multi-user interaction in a computer system having multiple computers interconnected over a network includes receiving a multiuser group node by a first computer over the network, the multiuser group node having an owner other than the first computer, the first computer including a multimedia player presenting a multimedia display implemented by a scene graph, the node including a plurality of control parameters. The method further includes receiving an input request to access the node; accessing the node if a first control parameter is activated; and denying access to the node if the first control parameter is not activated Consistent with the invention, an apparatus for providing multi-user communication includes at least one memory having program instructions, and at least one processor configured to use the program instructions. The processor executes the program instructions to perform the operations of receiving a multi-user group node in a multimedia player, the node including a plurality of control parameters; receiving an input request to access the node; accessing the node if a first control parameter is activated; and denying access to the node if the first control parameter is not activated.

Consistent with the invention, a computer-readable medium contains instructions for controlling a computer system to perform a method for providing multi-user communication. The method includes receiving a multi-user group node in a multimedia player, the node including a plurality of control parameters; receiving an input request to access the node; accessing the node if a first control parameter is activated; and denying access to the node if the first control parameter is not activated.

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. The same reference numbers may be used throughout the drawings and the following description to refer to the same or like parts.

A. Overview

Methods and apparatus consistent with the invention provide multi-user communication of multimedia content by dividing a client's scene into non-shared and shared parts. In one embodiment, the non-shared parts of the scene are organized into one or more single-user nodes with which other clients cannot interact.[2]

[2] As used herein, the term "single-user group node" refers to a node that does not support multi-user communication, such as an MPEG-4 Group (or Group2D) node or a VRML Group (or Group2D) node. The term "multi-user group node" refers to an extended single-user group node, consistent with the invention. Although the description contained herein is based on nodes, those skilled in the art will recognize that other object based scene descriptions can be used consistent with the invention.

The shared parts of the scene are organized into one or more multi-user group nodes. These multi-user group nodes enable multiple clients to access the same scene and to interact with its shared content. Each multi-user group node is an extension of a Group node. In addition to the functionality provided by a single-user group node, a multi-user group node wraps its children with control mechanisms required for supporting multi-user communication. These control mechanisms may be provided as boolean exposed fields that act as switches to control initiation of interaction, update control, privacy, and object accessibility. A client's scene may have multiple multi-user group nodes represented in hierarchical order or each representing a different part of a shared scene.

B. Architecture

Figure 1:
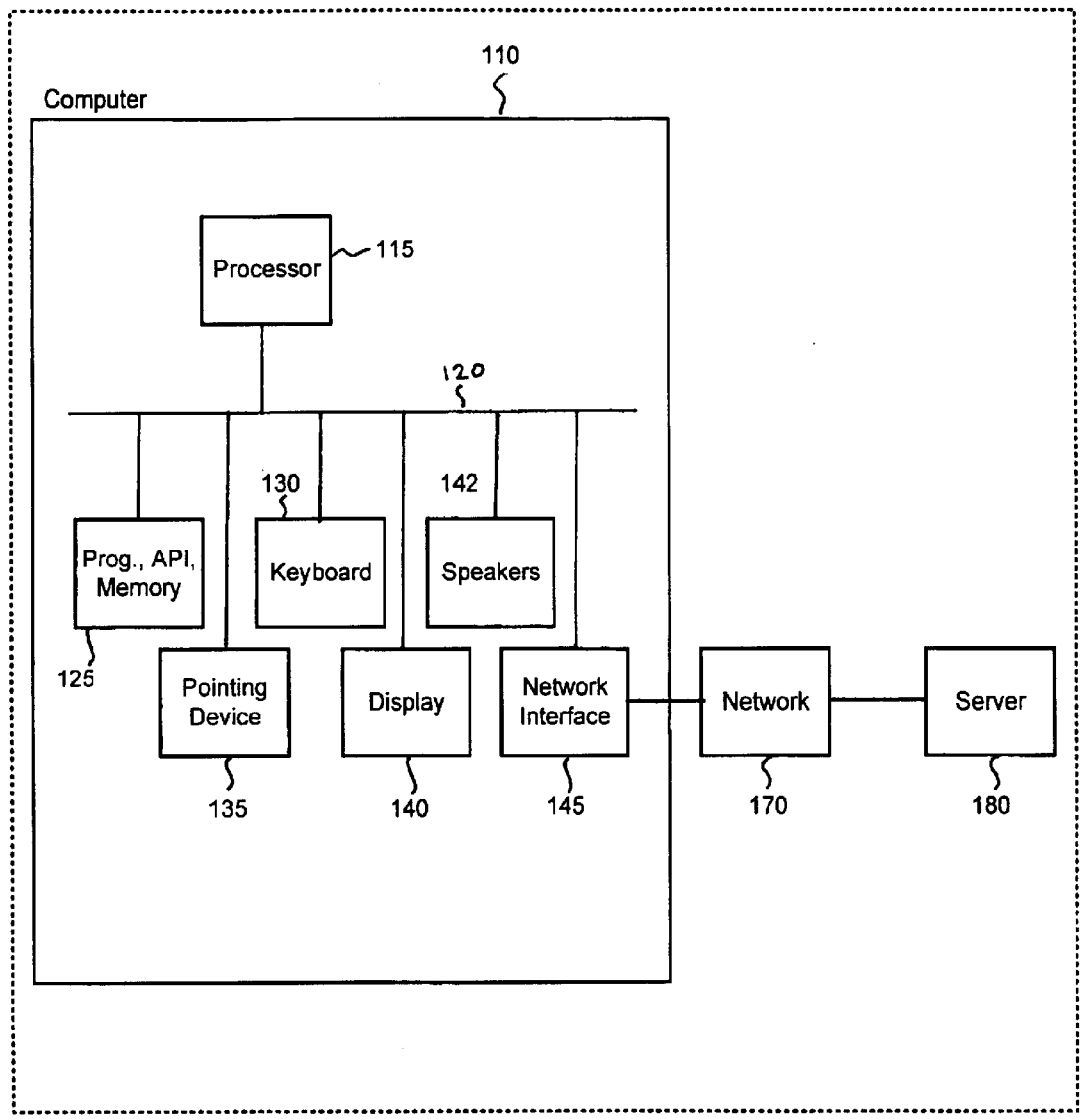
FIG. 1 is a block diagram of a computer system in which methods and apparatus consistent with the invention may be implemented.

FIG. 1 is a block diagram of a computer system 100 in which methods and apparatus consistent with the invention may be implemented. System 100 includes a computer 110 connected to a server 180 via a network 170. Network 170 may be a local area network (LAN), a wide area network (WAN), or the Internet. System 100 is suitable for use with the Java™ programming language, although one skilled in the art will recognize that methods and apparatus consistent with the invention may be applied to other suitable user environments.

Computer 110 includes several components that are all interconnected via a system bus 120. Bus 120 may be, for example, a bi-directional system bus that connects the components of computer 110, and contains thirty-two address lines for addressing a memory 125 and a thirty-two bit data bus for transferring data among the components. Alternatively, multiplex data/address lines may be used instead of separate data and address lines. Computer 110 communicates with other user's computers on network 170 via a network interface 145, examples of which include Ethernet or dial-up telephone connections.

Computer 110 contains a processor 115 connected to a memory 125. Processor 115 may be microprocessor manufactured by Motorola, such as the 680X0 processor or a processor manufactured by Intel, such as the 80X86 or Pentium processors, or a SPARC™ microprocessor from Sun Microsystems, Inc. However, any other suitable microprocessor or micro-, mini-, or mainframe computer, may be used. Memory 125 may comprise a RAM, a ROM, a video memory, or mass storage. The mass storage may include both fixed and removable media (e.g., magnetic, optical, or magnetic optical storage systems or other available mass storage technology). Memory 125 may contain a program, an application programming interface (API), and a virtual machine (VM) that contains instructions for handling constraints, consistent with the invention.

A user typically provides information to computer 110 via a keyboard 130 and a pointing device 135, although other input devices may be used. In return, information is conveyed to the user via display screen 140.

C. Architectural Operation

In a preferred implementation, methods and apparatus consistent with the invention employ an extension of two prior art single-user group nodes Group and Group2D (which are described in more detail in "The Annotated VRML 2.0 Reference Manual," by Rikk Carey and Gavin Bell, Addison-Wesley Developers Press (1997)).

```
Group {
    eventInMFNode          addChildren      NULL
    eventInMFNode          removeChildren   NULL
    exposedField MFNode    children         NULL
    field        SFVec2f   bboxCenter       0,0,0
    field        SFVec2f   bboxSize         -1,-1,-1
}
Group2D {
    eventInMFNode          addChildren      NULL
    eventInMFNode          removeChildren   NULL
    exposedField MFNode    children         NULL
    field        SFVec2f   bboxCenter       0,0
    field        SFVec2f   bboxSize         -1,-1
}
```

In each of these single-user group nodes, the fields identified above perform the following functions:

| | |
|---|---|
| addChildren eventIn: | This field specifies a list of objects that must be added to the group node. |
| removeChildren eventIn: | This field specifies a list of objects that must be removed from the group node. |
| children: | This field contains the current list of objects contained in the group node. |
| bboxCenter: | This field specifies the center of the bounding box. |
| bboxSize: | This field specifies the dimensions (in length, width, and/or height) of the bounding box.[3] |

[3] It is possible not to transmit the bboxCenter and bboxSize fields, but if they are transmitted, they should contain all children of the group node.

The single-user nodes Group and Group2D were adopted in the MPEG-4 standard as Binary Format for Scene (BIFS) nodes. If more than one user desires to interact with a single scene, these MPEG-4 group nodes are insufficient because they provide no mechanism for concurrency control or access control. As set forth more completely in copending U.S. patent application Ser. No. 09/176,101, entitled "MULTI-USER EXTENSION MECHANISMS FOR CLIENT-SERVER SYSTEM," these deficiencies may be overcome by creating two new BIFS group nodes called MultiUserGroup and MultiUserGroup2D. Any client may create a group node of either of these two types and transmit a copy ("replica") of the new type group node to other clients. The new type group nodes have control mechanisms for supporting multi-user communication, as follows:

```
MultiUserGroup {
        eventInMFNode           addChildren        NULL
        eventInMFNode           removeChildren     NULL
        exposedField MFNode     children           NULL
        exposedField SFBool     isInitiator        TRUE
        exposedField SFBool     isActive           TRUE
        exposedField SFBool     isPrivate          TRUE
        exposedField SFBool     isAccessible       TRUE
        field        SFVec2f    bboxCenter         0,0,0
        field        SFVec2f    bboxSize           -1,-1,-1
}
MultiUserGroup2D {
        eventInMFNode           addChildren        NULL
        eventInMFNode           removeChildren     NULL
        exposedField MFNode     children           NULL
        exposedField SFBool     isInitiator        TRUE
        exposedField SFBool     isActive           TRUE
        exposedField SFBool     isPrivate          TRUE
        exposedField SFBool     isAccessible       TRUE
        field        SFVec2f    bboxCenter         0,0
        field        SFVec2f    bboxSize           -1,-1
}
```

In each of these group nodes, the fields identified above perform the following functions:

addChildren eventIn: This field performs the same function as in a Single-user group node.

removeChildren eventIn: This field performs the same function as in a Single-user group node.

children: This field performs the same function as in a Single-user group node.

isInitiator: This field indicates whether a client is the initiator for the group node. If this field is set to FALSE, any state changes made to the group node by the client in which it resides need not be transmitted to other clients. If this field is set to TRUE, the group node on this client is an initiator; accordingly, any state changes to its state must be transmitted to other clients. It is possible to set the isInitiator field to TRUE in more than one client. In such cases, the application program shall handle the distribution of state changes from multiple initiators to replicas.

isActive: This field indicates whether a client should implement any state changes for the node which are received from other clients, and also whether state changes for the node occurring on this client should be transmitted to other clients. If this field is set to TRUE in a client node, any node state changes received by the client from other clients will be implemented in this node residing on this client. If this field is set to FALSE, any received state changes will not be implemented. Also, even if isInitiator is TRUE, a FALSE setting of isActive will prevent any state changes appearing on this client from being transmitted to other clients.

isPrivate: This field indicates who is allowed to modify the group node. If this field is set to TRUE, only the owner of the group node may modify the group node's content. If this field is set to FALSE, other users can also modify the group node's content.

isAccessible: This field indicates who is allowed to access the group node. If this field is set to FALSE, only the owner (i.e., the creator client) of the group node can access/read the group node. If this field is set to TRUE, other clients can also access the group node's content.

bboxCenter: This field performs the same function as in a Single-user group node.

bboxSize: This field performs the same function as in a Single-user group node.

Figure 2:
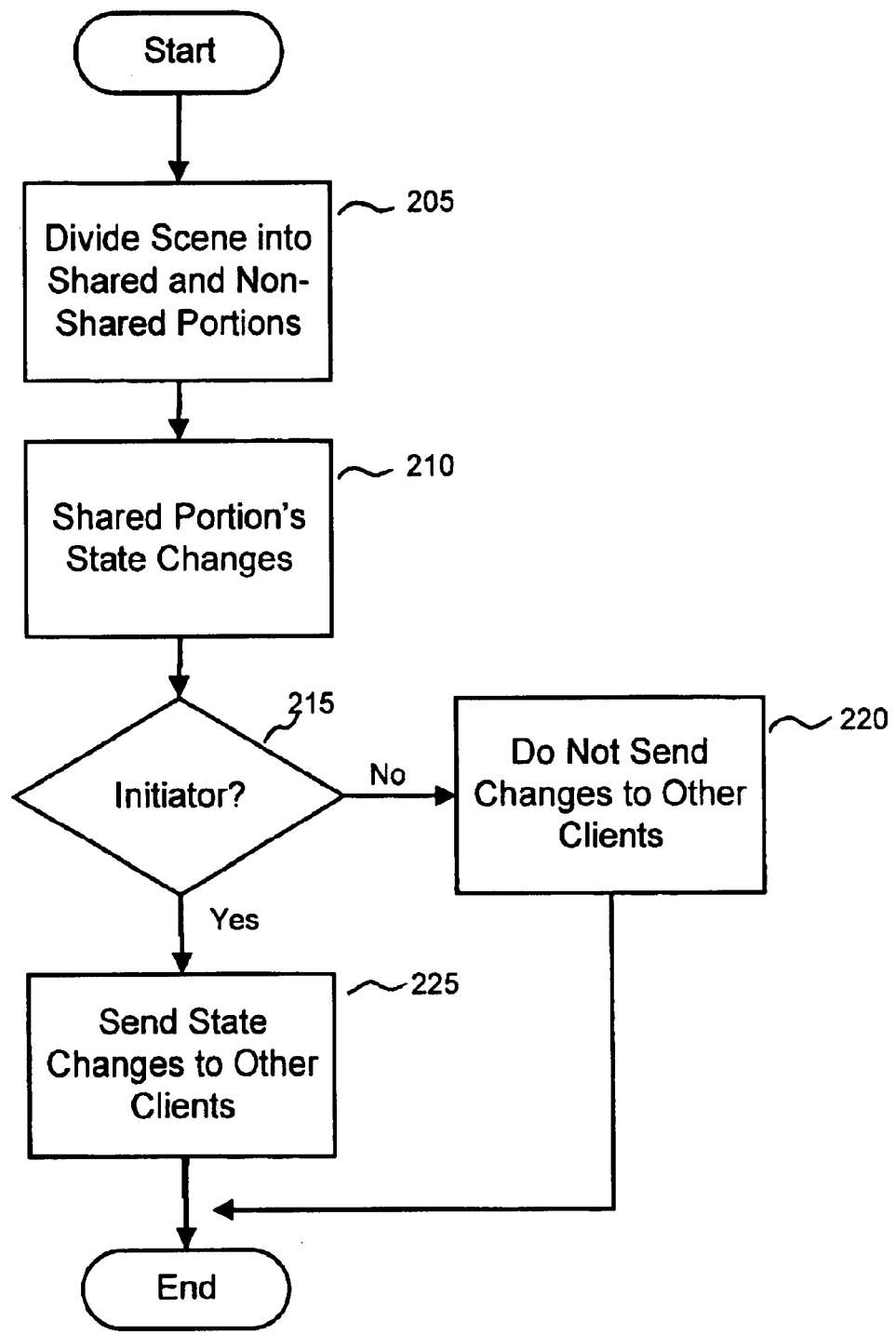
FIG. 2 is a flow diagram of a method for an initiator control mechanism used by MultiUserGroup nodes.

FIG. 2 is a flow diagram of a method for an initiator control mechanism consistent with the invention. In one embodiment, a multimedia scene is created on a user's client terminal using VRML or MPEG-4. At stage 205, the multimedia scene is divided into shared and non-shared parts. This can be accomplished by using a BIFS mechanism. The shared part of a client's scene includes MultiUserGroup nodes with which multiple user clients can interact.[4] The non-shared part of the client's scene contains Group nodes that belong only to that client. The client that creates the nodes may be known as the "owner" of the nodes.

[4] Although the description for FIGS. 2–5 uses the terminology described above in reference to MultiUserGroup, those skilled in the art will appreciate that the names used are explanatory only and that other multi-user group nodes or objects may be used consistent with the invention.

At stage 210, the state of a MultiUserGroup node on a client changes. At stage 215, whether the changes should be transmitted to replicas of the MultiUserGroup node which exist on other clients is determined. This can be accomplished by using the isInitiator boolean field, as described above. If the client is not an initiator for the MultiUserGroup node (e.g., the isInitiator field is FALSE), any state changes made at that client to the node present at that client (either original node or replica node) are not transmitted to other clients at stage 220. If the client is an initiator for the MultiUserGroup node (e.g., the isInitiator field is TRUE), then the state changes are sent to other clients at stage 225.

Figure 3:
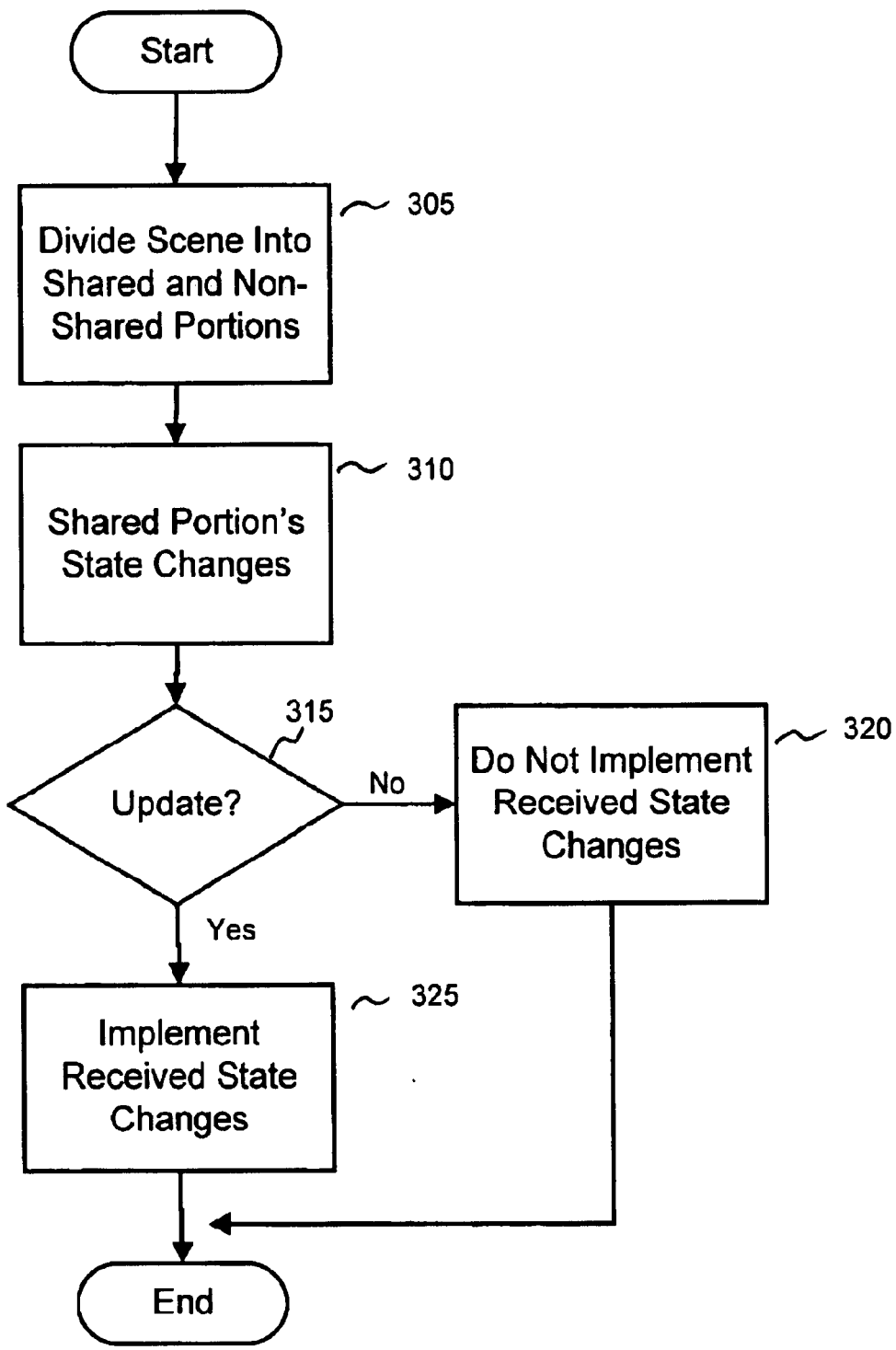
FIG. 3 is a flow diagram of a method for an update control mechanism used by MultiUserGroup nodes.

FIG. 3 is a flow diagram of a method for an update control mechanism consistent with the invention. In one embodiment, a scene is divided into shared and non-shared parts at stage 305 as described above in reference to FIG. 2. At stage 310, the state of a MultiUserGroup node changes on a client. At stage 315, whether the state change of the MultiUserGroup node should be transmitted to other clients and whether such other clients will implement a received state change on their node is determined. This can be accomplished by using (in addition to the isInitiator field) the isActive boolean field, as described above. If the MultiUserGroup node is not active for certain clients (e.g., the isActive field is FALSE), those clients will not implement any received state changes for that node at stage 320. If the MultiUserGroup node is active for certain clients (e.g., the isActive field is TRUE), state changes received by those clients will be implemented at stage 325.

Figure 4:
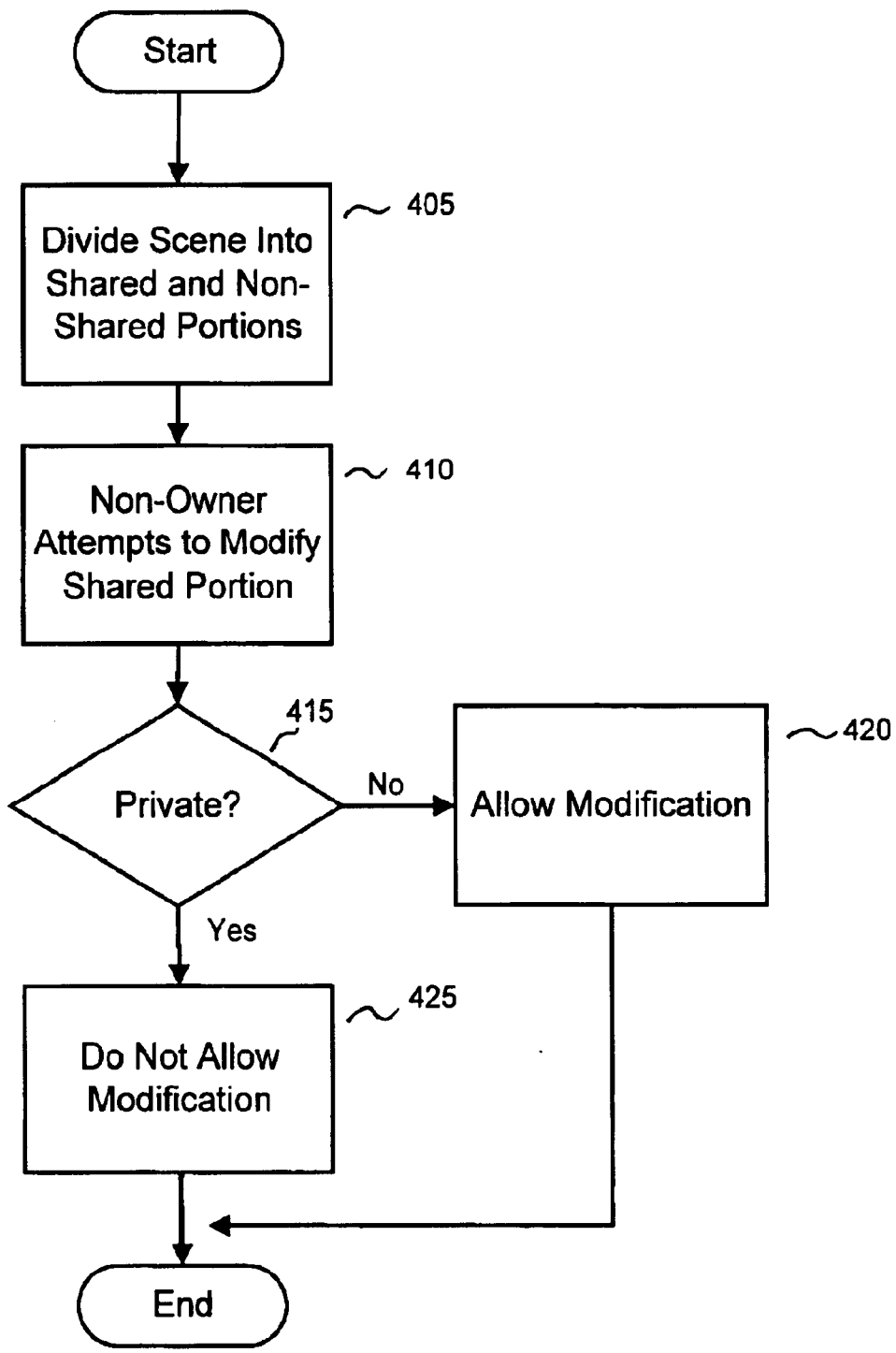
FIG. 4 is a flow diagram of a method for a privacy control mechanism used by MultiUserGroup nodes.

FIG. 4 is a flow diagram of a method for a privacy control mechanism consistent with the invention. In one embodiment, a scene is divided into shared and non-shared parts at stage 405 as described above in reference to FIG. 2. At stage 410, a client other than the owner of the MultiUserGroup node attempts to modify the MultiUserGroup node. At stage 415, whether the non-owner should be permitted to modify the MultiUserGroup node is determined. This can be accomplished by using the isPrivate boolean field, as described above. If other clients are permitted to modify the MultiUserGroup node (e.g., the isPrivate field is FALSE), then the non-owner is permitted to modify the content of the MultiUserGroup node at stage 420. If only the owner-may modify the MultiUserGroup node (e.g., the isPrivate field is TRUE), then the non-owner is not permitted to modify (i.e., is precluded from modifying) the content of the MultiUserGroup node at stage 425.

Figure 5:
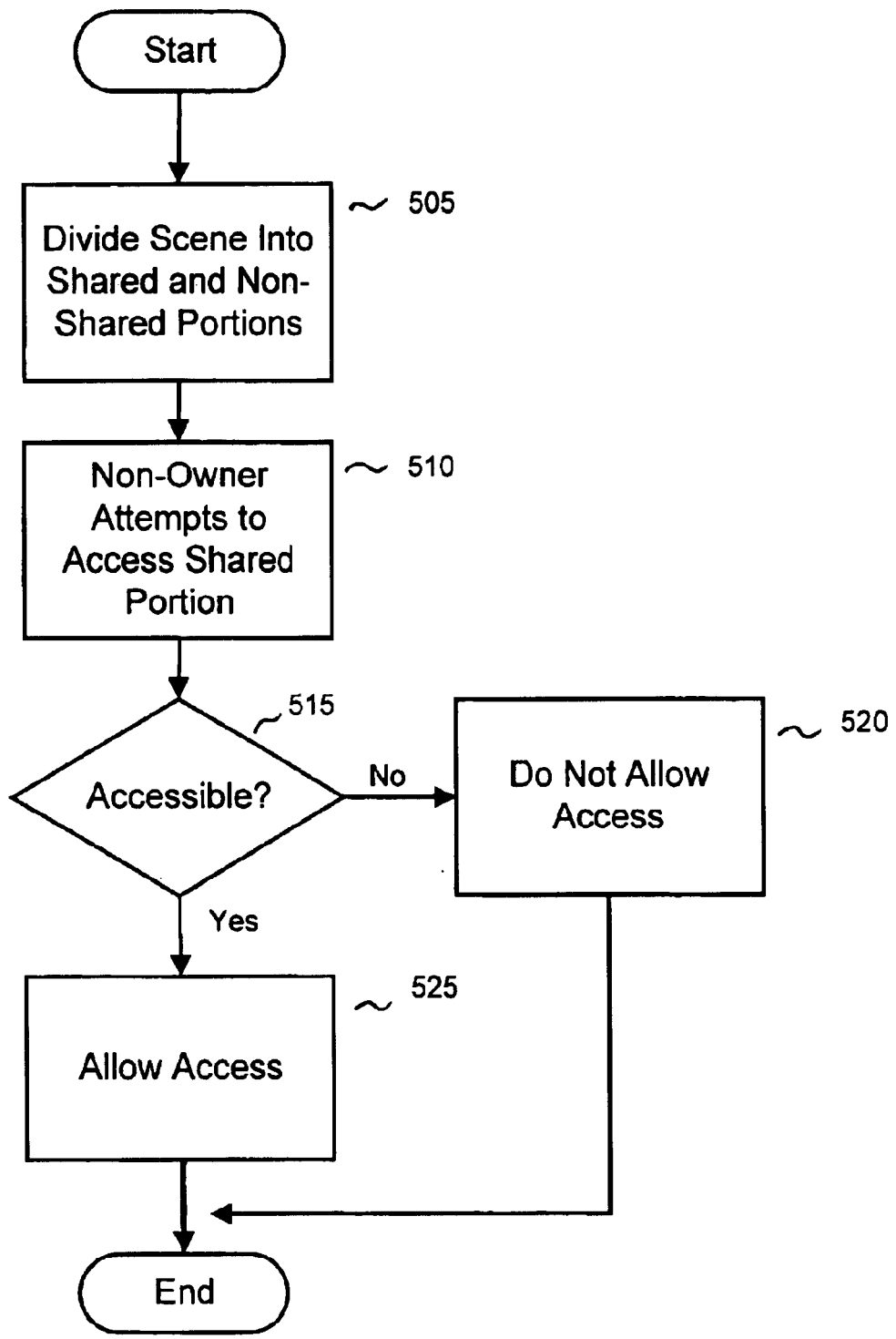
FIG. 5 is a flow diagram of a method for an accessibility control mechanism used by MultiUserGroup nodes.

FIG. 5 is a flow diagram of a method for an accessibility control mechanism consistent with the invention. In a preferred implementation, a scene is divided into shared and non-shared parts at stage 505 as described above in reference to FIG. 2. At stage 510, a client other than the owner of the MultiUserGroup node attempts to access/read the MultiUserGroup node. At stage 515, whether the non-owner should be permitted to access/read the MultiUserGroup node is determined. This can be accomplished by using the isAccessible boolean field, as described above. If only the owner of the MultiUserGroup can access it (e.g., the isAccessible field is FALSE), then the non-owner is not permitted to access/read the content of the MultiUserGroup node at stage 520. If other clients are permitted to access/read the MultiUserGroup node (e.g., the isAccessible field is TRUE), then the non-owner is permitted to access/read the content of the MultiUserGroup node at stage 525.

Figure 6:
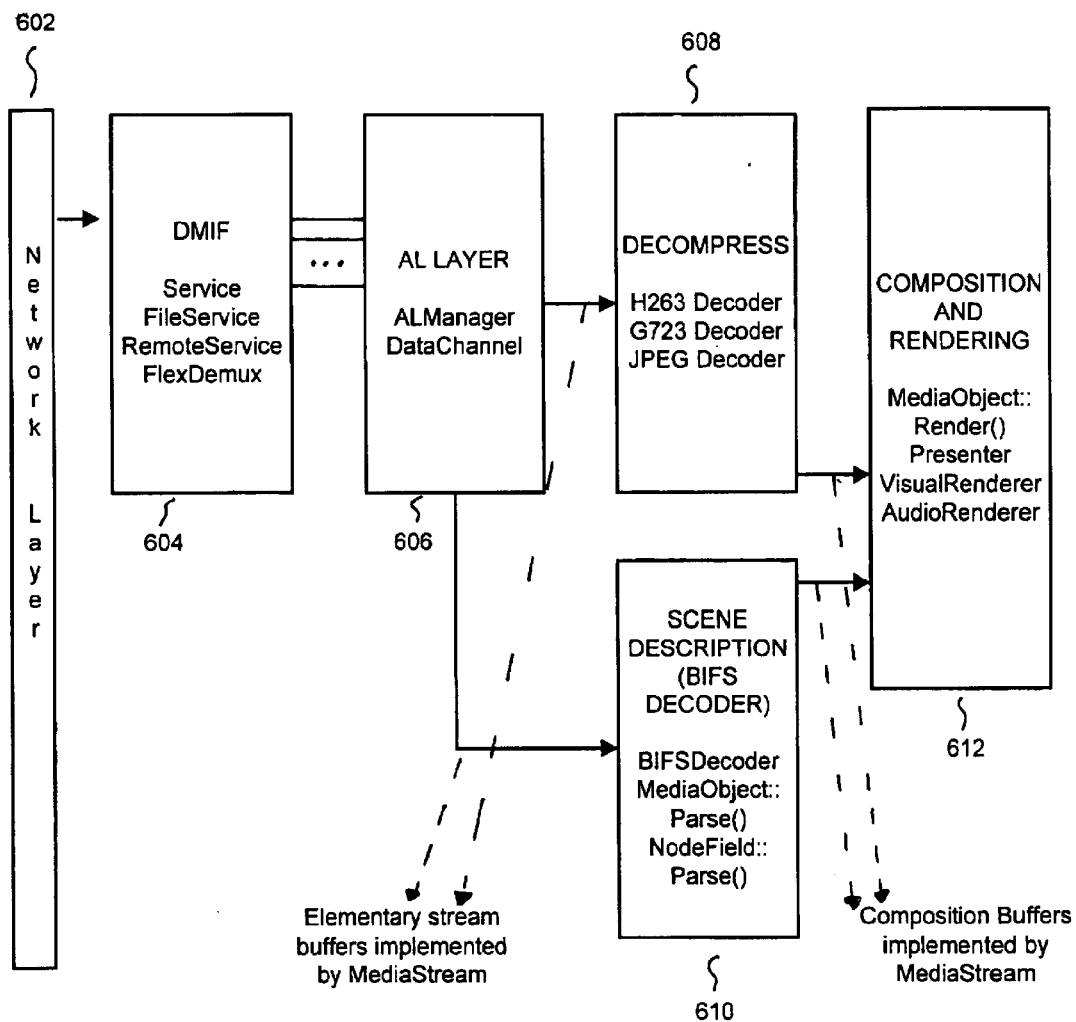
FIG. 6 is a block diagram of a prior art multimedia player.

In one embodiment, the present invention constitutes an extension of existing multimedia players. FIG. 6 shows a block diagram of an exemplary prior art multimedia player 600, which has been implemented as the IM1 player. A more complete description of player 600 is contained in the document ISO/IEC JTC1/SC29/WG11, MPEG97/M311, published Nov. 1997, by the International Organization for Standardization and attached to this application as appendix A. As shown in FIG. 6, player 600 receives data from a network layer 602, which may be any type of network, such as network 170.

Data from network layer 602 is supplied to a Delivery Multimedia Integration Framework (DMIF) 604. As is well known to those skilled in the art, DMIF 604 is defined in the MPEG-4 standard and is generally described in the document ISO/IEC JTC1/SC29/WG11 N2323 published Jul. 1998 by the International Organization for Standardization and attached as Appendix B. DMIF 604 provides a session protocol for the management of multimedia streaming over generic technologies, such as the Internet or from a disc or CD-ROM.

Data from DMIF 604 flows to an adaption layer ("AL layer") 606. As is known to those skilled in the art, AL layer 606 receives of elementary stream packets from a service, parses packet headers, and passes access units on to appropriate components through MediaStreams. In particular, data from AL layer 606 is then supplied to a decompression section 608 and a screen description section 610 comprising a Binary Format for Scene (BIFS) decoder. As shown in FIG. 6, decompression section 608 may include one or more decoders such as an H263 decoder, a G723 decoder or a JPEG decoder. The structure and operation of these decoders is well-known to those skilled in the art. Similarly, this screen description section 610 includes the classes BIFS-Decoder, MediaObject, and NodeField.

The output of decompression section 608 and screen description section 610 are supplied to a composition and rendering section 612. Section 612 manipulates data received thereby and controls the output to specific devices such as display screen 140 and speakers 142. As shown in FIG. 6, section 612 includes the classes MediaObject::Render( ), Presenter, VisualRenderer, and AudioRenderer. The structure and operation of these classes is well known to those skilled in the art, as described in Appendix A and references cited therein.

As set forth in copending application Ser. No. 09/176,101 entitled "MULTI-USER EXTENSION MECHANISMS FOR CLIENT-SERVER SYSTEM," multi-user functionality is provided to the MPEG-4 standard by the processing of multi-user group nodes. The present invention includes improvements and extensions to prior art multimedia players such as player 600 by the provision of methods and apparatus for implementing the multi-user group nodes described in copending application Ser. No. 09/176,101. In methods and apparatus consistent with the invention, a code file, a header file, and an information file are added to multimedia player 600. In one embodiment, these files are preferably implemented in a language such as C++ using MPEG-4 conventions and serve to process an incoming data stream that includes multi-user group nodes MultiUserGroup and MultiUserGroup2D. In one embodiment, a header file Mgroup.H is set forth below.

```
.//MGROUP.H Header file for multi-user grouping node
#ifndef __MGROUP_H__
#define __MGROUP_H__
#include "base/Node3D.h"
/* Multi-User Grouping node. This class works as a generic group of
multi-user shared nodes. */
class MGroup : public Node3D{
public:
    MGroup( );
    virtual                    ~MGroup( );
    virtual void               RegisterObject( );
    virtual BOOL               AddChild(Node* pObject);
    virtual BOOL               RemoveChild(Node* pObject);
    Node*                      GetFirstChild( );
    Node*                      GetNextSibling( );
    int                        GetChildCount( ) const;
    virtual MediaObject*       FindNode(int nID);
    virtual MediaObject*       FindObjectDescriptor(int nObID);
    MFNodeType<SF3DNode>&      GetChildren( );
    virtual void               OnUpdate( );
    virtual void               UpdateBbox( );
protected:
    MFNodeType<SF3DNode>       children;
    MFNodeType<SF3DNode>       addChildren;
    void             OnaddChildren( );
    MFNodeType<SF3DNode>       removeChildren;
    void             OnremoveChildren( );
public:
    #ifndef BIFSENC
    virtual BOOL     ParseChild(BIFSDecoder *pBifs);
    #endif
private:
    int              m_nCurrentElement;
    bool                         isActive;
    bool                         isInitiator;
    bool                         isPrivate;
    bool                         isAccessible;
    BIFS_DECLARE_NODE
};
#include "MGroup.i"
#endif
```

This embodiment further includes a source code file Mgroup.cpp as set forth below:

```
//MGROUP.CPP Source file for multi-user grouping node
#include "MGroup.h"
#include "base/Executiv.h"
#include "base/Presenter.h"
#include "base/BifsDec.h"
#include <stdio.h>
BIFS_IMPLEMENT_NODE_START(MGroup)
 BIFS_EVENT(MGroup, addChildren,  0, -1, 0, 0)
 BIFS_EVENT(MGroup, removeChildren, 1, -1, 0, 0)
 BIFS_CHILDREN(MGroup, children,   0, 2, 0, -1)
 BIFS_FIELD(MGroup, bboxCenter,   1, -1, -1, -1, 0, 0)
 BIFS_FIELD(MGroup, bboxSize,     2, -1, -1, -1, 0, 0)
BIFS_IMPLEMENT_NODE_END(MGroup)
void MGroup::RegisterObject( )
{
 GetExecutive( )->GetPresenter( )->InitMGroup(this);
}
void MGroup::OnUpdate( )
{
    for (int i = 0; i < children.GetLength( ); ++i)
        if ((Node*) children[i]) {
            ((Node*) children[i])->RemoveParent(this);
            ((Node*) children[i])->AddParent(this);
        }
```

-continued

```
        UpdateBbox( );
}
void MGroup::OnaddChildren( )
{}
void MGroup::OnremoveChildren( )
{}
bool MGroup::AddChild(Node* pObject)
{
    if (children.Append(pObject)) {
        UpdateBbox( );
        pObject->AddParent(this);
        return TRUE;
    }
    else
        return FALSE;
}
bool MGroup::RemoveChild(Node* pObject)
{
    if (children.RemoveNode(pObject)) {
        UpdateBbox( );
        return pObject->RemoveParent(this);
    }
    else
        return FALSE;
}
void MGroup::UpdateBbox( )
{
    Node* child = GetFirstChild( );
    if (child) {
        Vec3f center;
        Vec3f size;
        child->GetTransformedBbox(size, center);
        Vec3f fur(center);
        Vec3f bll(center);
        if (size.x > -1.0f) {
            size *= 0.5f
            fur += size;
            bll -= size;
        }
        while ((child = GetNextSiblin( ))) {
            child->GetTransformedBbox(size, center);
            if (size.x > 0.0f) {
                float tmp;
                size *= 0.5f;
                if (fur.x < (tmp = center.x + size.x))
                    fur.x = tmp;
                if (bll.x > (tmp = center.x - size.x))
                    bll.x = tmp;
                if (fur.y < (tmp = center.y + size.y))
                    fur.y = tmp;
                if (bll.y > (tmp = center.y - size.y))
                    bll.y = tmp;
                if (fur.z < (tmp = center.z + size.z))
                    fur.z = tmp;
                if (bll.z > (tmp = center.z - size.z))
                    bll.z = tmp;
            }
            else {
                if (fur.x < center.x)
                    fur.x = center.x;
                if (bll.x > center.x)
                    bll.x = center.x;
                if (fur.y < center.y)
                    fur.y = center.y;
                if (bll.y > center.y)
                    bll.y = center.y;
                if (fur.z < center.z)
                    fur.z = center.z;
                if (bll.z > center.z)
                    bll.z = center.z;
            }
        }
        Vec3f new_size(fur);
        Vec3f new_center(fur);
        new_size -= bll;
        new_center += bll;
        new_center *= 0.5;
        GetBbox(size, center);
        if (new_center != center ||
```

-continued

```
            new_size != size)
            SetBbox(new_size, new_center);
    }
    else
        SetBbox(Vec3f( ),
            Vec3f( ));
}
// Look in the branch under this node for an object with an ID of nID
MediaObject* MGroup::FindNode(int nID)
{
    MediaObject* pResult = MediaObject::FindNode(nID);
    for (Node* pNode = GetFirstChild( ); pNode && !pResult; pNode =
        GetNextSibling( ))
        pResult = pNode->FindNode(nID);
    return pResult;
}
// Look in the branch under this node for an object which expects a stream
// with object descriptor id of nObID
MediaObject* MGroup::FindObjectDescriptor(int nObID)
{
    MediaObject* pResult =
        MediaObject::FindObjectDescriptor(nObID);
    for (Node* pNode = GetFirstChild( ); pNode && !pResult; pNode =
        GetNextSibling( ))
        pResult = pNode->FindObjectDescriptor(nObID);
    return pResult;
}
#ifndef BIFSENC
bool MGroup::ParseChild(BIFSDecoder* pBifs)
{
    int nPos;
    bool bResult = FALSE;
    switch (pBifs->ParseInt(2)) {
    case 0: // insertion at a specified position
        nPos = pBifs->ParseInt(8);
        TRACEF("[%d]", nPos);
        bResult = children.InsertElement(pBifs, this, nPos);
        break;
    case 2: // insertion at the beginning of the field
        TRACEF("[0]", 0);
        bResult = children.InsertElement(pBifs, this, 0);
        break;
    case 3: // insertion at the end of the field
        TRACEF("[end]", 0);
        bResult = children.AppendElement(pBifs, this);
        break;
    default:
        assert(0);
        break;
    }
    if (bResult) {
        SetUpdateTime ( );
        OnUpdate( );
        children.OnFieldUpdate ( );
    }
    return bResult;
}
#endif
```

Furthermore, this embodiment includes an information file Mgroup.i, as set forth below:

```
#MGroup.i
inline MGroup::MGroup( )
    :m_nCurrentElement(0)
{
}
// Destructor
inline MGroup::~MGroup( )
{
    for (int i = children.GetLength( ); i > 0;)
        if ((Node*) children[--i])
            ((Node*) children[i])->RemoveParent(this);
}
inline Node* MGroup::GetNextSibling( )
```

-continued

```
{
  if (children.GetLength( ) <= m_nCurrentElement)
    return NULL;
  else
    return (Node*) children[m_nCurrentElement++];
}
// Get first child in this group
inline Node* MGroup::GetFirstChild( )
{
  m_nCurrentElement = 0;
  return GetNextSibling( );
}
// Get number of children in this group
inline int MGroup::GetChildCount( ) const
{
  return children.GetLength( );
}
// Get children
inline MFNodeType<SF3DNode>& MGroup::GetChildren( )
{
  return children;
}
```

The described embodiment of the present invention further includes additional modifications to the MPEG-4 code of IM1 multimedia player 600, as set forth below. As shown in FIG. 6, a composition and rendering operation is performed by player 600, using a presenter file. Presenter and OpenGLPresenter are presenter files selected at the users option when compiling the IM1 player. Thus, modifications as set forth below are made to the header and code files of the two presenter files. Although the disclosed embodiment uses conventions and syntax of the C++, other programming conventions could of course be used to implement the disclosed modifications.

Add InitMgroup( ) function in Presenter.h and Presenter.cpp files

Add InitMgroup( ) function in OpenGLPresenter.h and OpenGLPresenter.cpp files

Add "class Mgroup" to the beginning of Presenter.h

Add "#include Mgroup.h" to Presenter.cpp

Add "CODE_MGroup" in Nodecode.h

Add Mgroup to Node Tables.cpp

Add MgroupProxy.cpp and MgroupProxy.h

Add "#include MgroupProxy.h" to OpenGLPresenter.cpp

The concept of "proxy" nodes is described in the aforementioned MPEG-4 specification. Briefly, each BIFS node has a corresponding "proxy" node which provides rendering functions. For example, a non-proxy node, like Rectangle, does not know how to "draw" itself. A corresponding proxy node, in this case, RectangleProxy, is included to provide rendering, that is, to draw the rectangle on the screen. Accordingly, one embodiment of the invention uses the following code to provide an appropriate proxy node.

```
//MGroupProxy.cpp
#include "base/defs.h"
#include "MGroupProxy.h"
#include <GL/gl.h>
BOOL MGroupProxy::Render(OpenGLPresenter* pPresenter, DWORD dwTime)
{
  MGroup* pGroup = (MGroup*) GetMediaObject( );
  ZArray<NodeProxy*> nodes;
  for (Node* pObject = pGroup->GetFirstChild( ); pObject; pObject = pGroup->GetNextSibling( )) {
    NodeProxy* pProxy = (NodeProxy*) pObject->GetPresenterData( );
    int i = 0;
    float drawingOrder = pProxy->GetDrawingOrder( );
    while (nodes.GetLength( ) > i && nodes[i]->GetDrawingOrder( ) > drawingOrder)
      ++i;
    nodes.InsertAt(i, pProxy);
  }
  for (int j = 0; j < nodes.GetLength( ); ++j)
    nodes[j]->Render(pPresenter, dwTime);
#ifdef _DEBUG
  {
    GLenum error;
    error = ::glGetError( );
    while (error != GL_NO_ERROR) {
      COMPLAIN("MGroupProxy::Render( ) [%08x]: GL error %d\n", this, error);
      error = ::glGetError( );
    }
  }
#endif
  return Node3DProxy::Render(pPresenter, dwTime);
}
void MGroupProxy::Select(OpenGLPresenter* pPresenter, DWORD dwTime, NodeProxy*&
intersectingObject, unsigned int& depth)
{
  MGroup* pGroup = (MGroup*) GetMediaObject( );
  for (Node* pObject = pGroup->GetFirstChild( ); pObject; pObject = pGroup->GetNextSibling( ))
    ((NodeProxy*)pObject->GetPresenterData( ))->Select(pPresenter, dwTime, intersectingObject, depth);
}
BOOL MGroupProxy::RenderLights(OpenGLVisualRenderer* pRenderer, DWORD dwTime)
{
```

-continued

```
  MGroup* pGroup = (MGroup*) GetMediaObject( );
  for (Node* pObject = pGroup->GetFirstChild( ); pObject; pObject = pGroup->GetNextSibling( ))
    ((NodeProxy*) pObject->GetPresenterData( ))->RenderLights(pRenderer, dwTime);
  return TRUE;
}
void MGroupProxy::RenderDescription(OpenGLVisualRenderer* pRenderer, DWORD dwTime)
{
  MGroup* pGroup = (MGroup*) GetMediaObject( );
  GLfloat color[] = { 0.0f, 1.0f, 0.0f, 0.75f};
  ::glColor4fv(color);
  RenderDescriptionBox(pRenderer, "MGroup");
  :glPushMatrix( );
  ::glScalef(1.0f/ pGroup->GetChildCount( ), 1.0f, 1.0f);
  ::glTranslatef(0.0f, −1.0f, 0.0f);
  for (Node* pObject = pGroup->GetFirstChild( ); pObject; pObject = pGroup->GetNextSibling( )) {
    ((NodeProxy*) pObject->GetPresenterData( ))->RenderDescription(pRenderer, dwTime);
    ::glTranslatef(1.0f, 0.0f, 0.0f);
  }
  ::glPopMatrix( );
}
void MGroupProxy::Select(OpenGLPresenter* pPresenter, DWORD dwTime,
          NodeProxy*& intersectingObject,
          ZArray<NodeProxy*>& activatedSensors, unsigned int& depth,
          const ZArray<NodeProxy*>& localSensors)
{
  MGroup* pGroup = (MGroup*) GetMediaObject( );
  ZArray<NodeProxy*> sensors;
  // first check children to see if any of them are pointing device sensors
  for (Node* pObject = pGroup->GetFirstChild( ); pObject; pObject = pGroup->GetNextSibling( ))
    if (((NodeProxy*) pObject->GetPresenterData( ))->IsPointingDeviceSensor( ))
      sensors += (NodeProxy*) pObject->GetPresenterData( );
  // then traverse scene graph further down
  if (sensors.GetLength( ))
    for (Node* pObject = pGroup->GetFirstChild( ); pObject; pObject = pGroup->GetNextSibling( ))
      ((NodeProxy*) pObject->GetPresenterData( ))->Select(pPresenter, dwTime,
                                     intersectingObject,
                                     activatedSensors, depth,
                                     sensors);
  else
    for (Node* pObject = pGroup->GetFirstChild( ); pObject; pObject = pGroup->GetNextSibling( ))
      ((NodeProxy*) pObject->GetPresenterData( ))->Select(pPresenter, dwTime,
                                     intersectingObject,
                                     activatedSensors, depth,
                                     localSensors);
}
int   MGroupProxy::FindSoundSources(ZArray<Sound*>& rSources3d, ZArray<Matrix>&
rTransformations3d,
          ZArray<Sound2D*>& rSources2d, ZArray<Matrix>& rTransformations2d,
          const Matrix& rTransform)
{
  MGroup* pGroup = (MGroup*) GetMediaObject( );
  int ret = 0;
  for (Node* pObject = pGroup->GetFirstChild( ); pObject; pObject = pGroup->GetNextSibling( ))
      ret += ((NodeProxy*)  pObject->GetPresenterData( ))->FindSoundSources(rSources3d,
rTransformations3d,
                                     rSources2d,
rTransformations2d,
                                     rTransform);
  return ret;
}
```

The described embodiment of the invention further uses the following code to provide a proxy header node:

```
//MGroupProxy.h
#ifndef_MGROUPPROXY_H_
#define_MGROUPPROXY_H_
#include "opengl/base/Node3DProxy.h"
class MGroupProxy
  :public Node3DProxy
{
public:
  /// Constructor
```

```
                                    -continued

MGroupProxy(MGroup* pGroup);
virtual BOOL            Render(OpenGLPresenter* pPresenter, DWORD dwTime);
virtual BOOL            RenderLights(OpenGLVisualRenderer* pRenderer, DWORD dwTime);
virtual void            Select(OpenGLPresenter* pPresenter, DWORD dwTime,
                            NodeProxy*& intersectingObject, unsigned int& depth);
virtual void            Select(OpenGLPresenter* pPresenter, DWORD dwTime,
                            NodeProxy*& intersectingObject,
                            ZArray<NodeProxy*>& activatedSensors, unsigned int& depth,
                            const ZArray<NodeProxy*>& localSensors);
virtual void            RenderDescription(OpenGLVisualRenderer* pRenderer, DWORD dwTime);
virtual int             FindSoundSources(ZArray<Sound*>& rSources3d, ZArray<Matrix>&
rTransformations3d,
                            ZArray<Sound2D*>& rSources2d, ZArray<Matrix>&
rTransformations2d,
                            const Matrix& rTransform);
};
#include "MGroupProxy.i"
#endif// _MGROUPPROXY_H_
```

Finally, the described embodiment of the invention uses the following code to provide an appropriate proxy information node:

```
// MGroupProxy.i
#include "group/MGroup.h"
// Constructor
inline MGroupProxy::MGroupProxy(MGroup* pGroup)
  :Node3DProxy(pGroup)
{
}
```

Figure 7A:
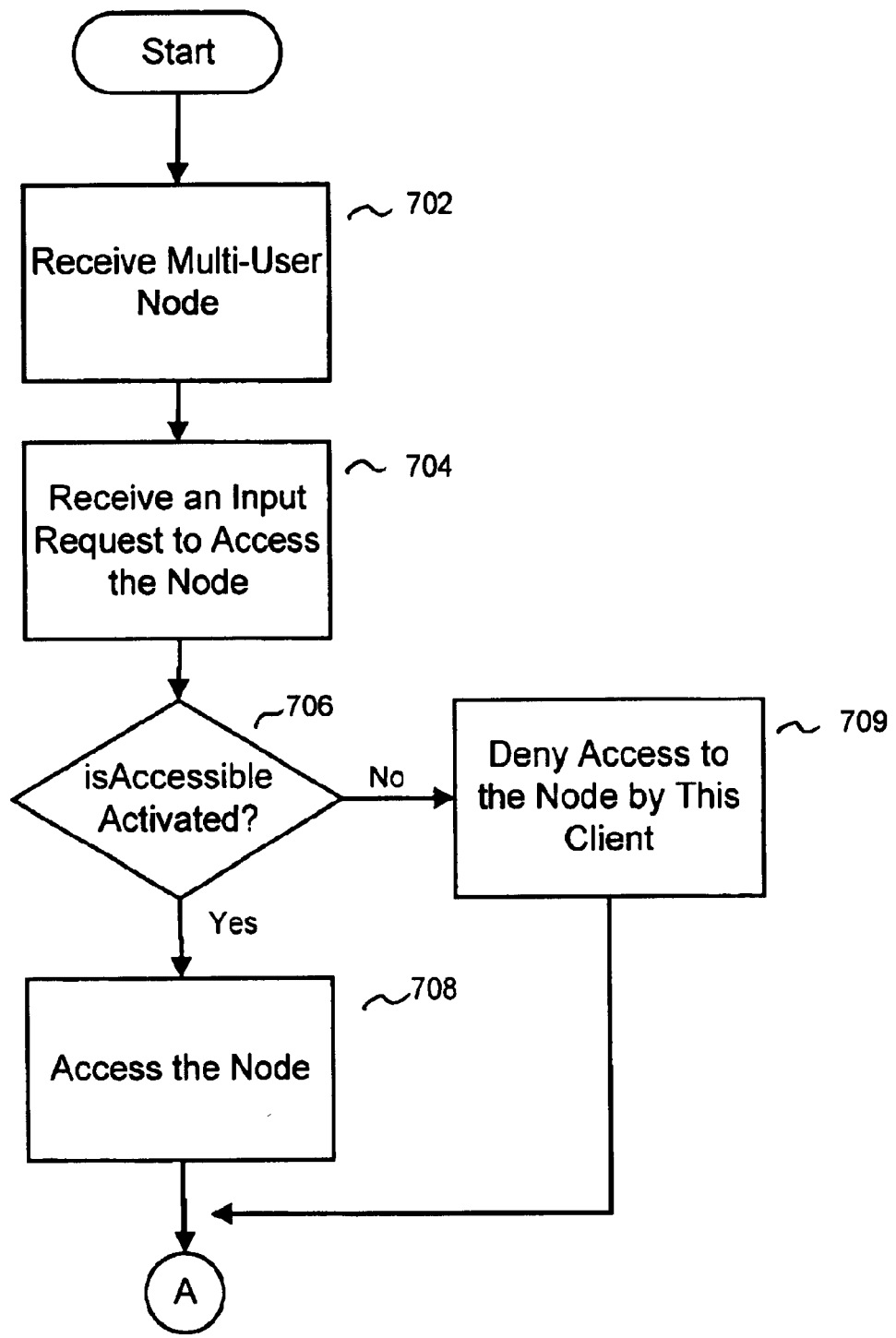
FIGS. 7A–7D are a flow diagram of a method consistent with the invention for implementing multi-user interaction in a computer system having multiple computers interconnected over a network
Figure 7B:
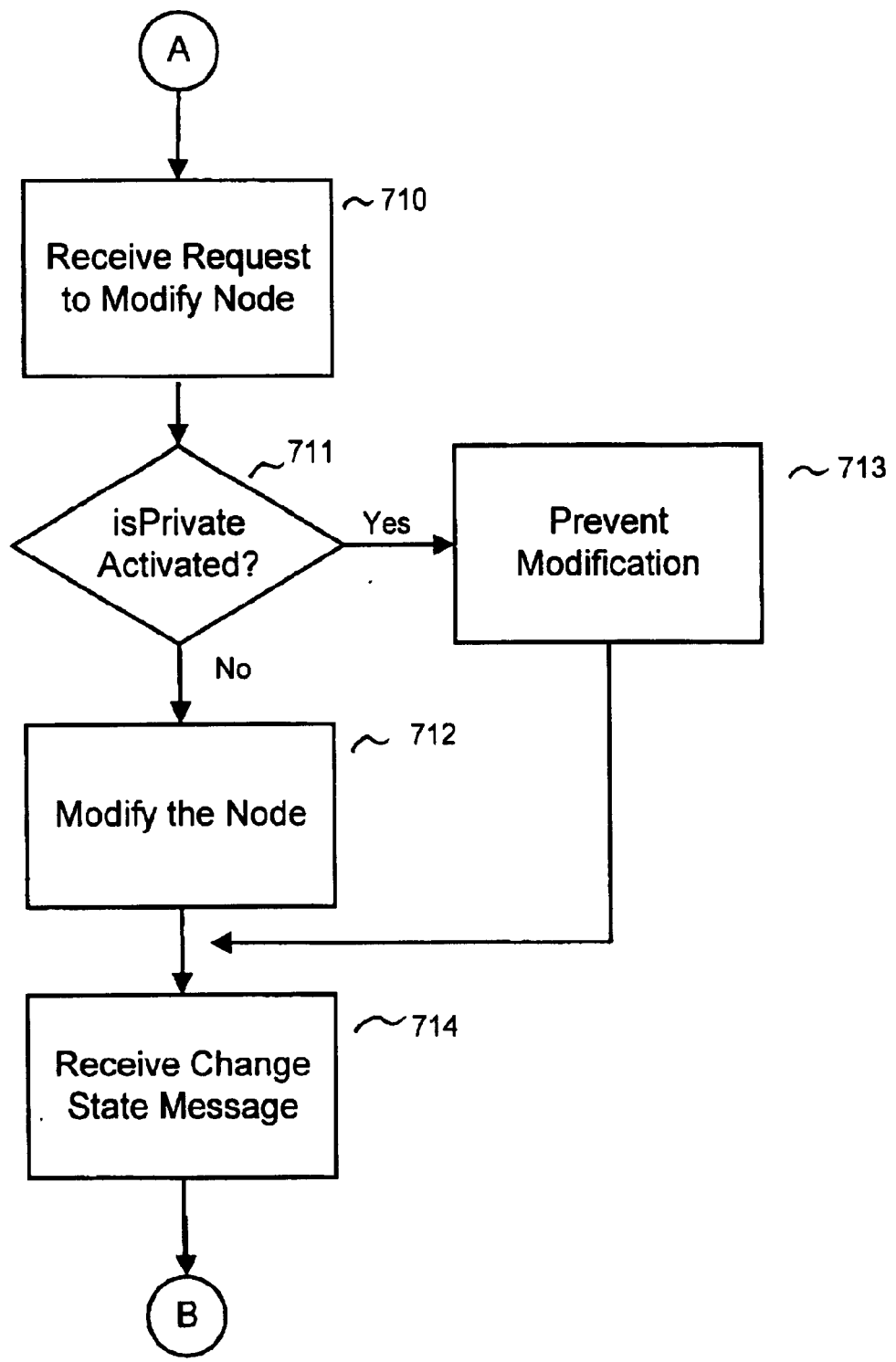
Figure 7C:
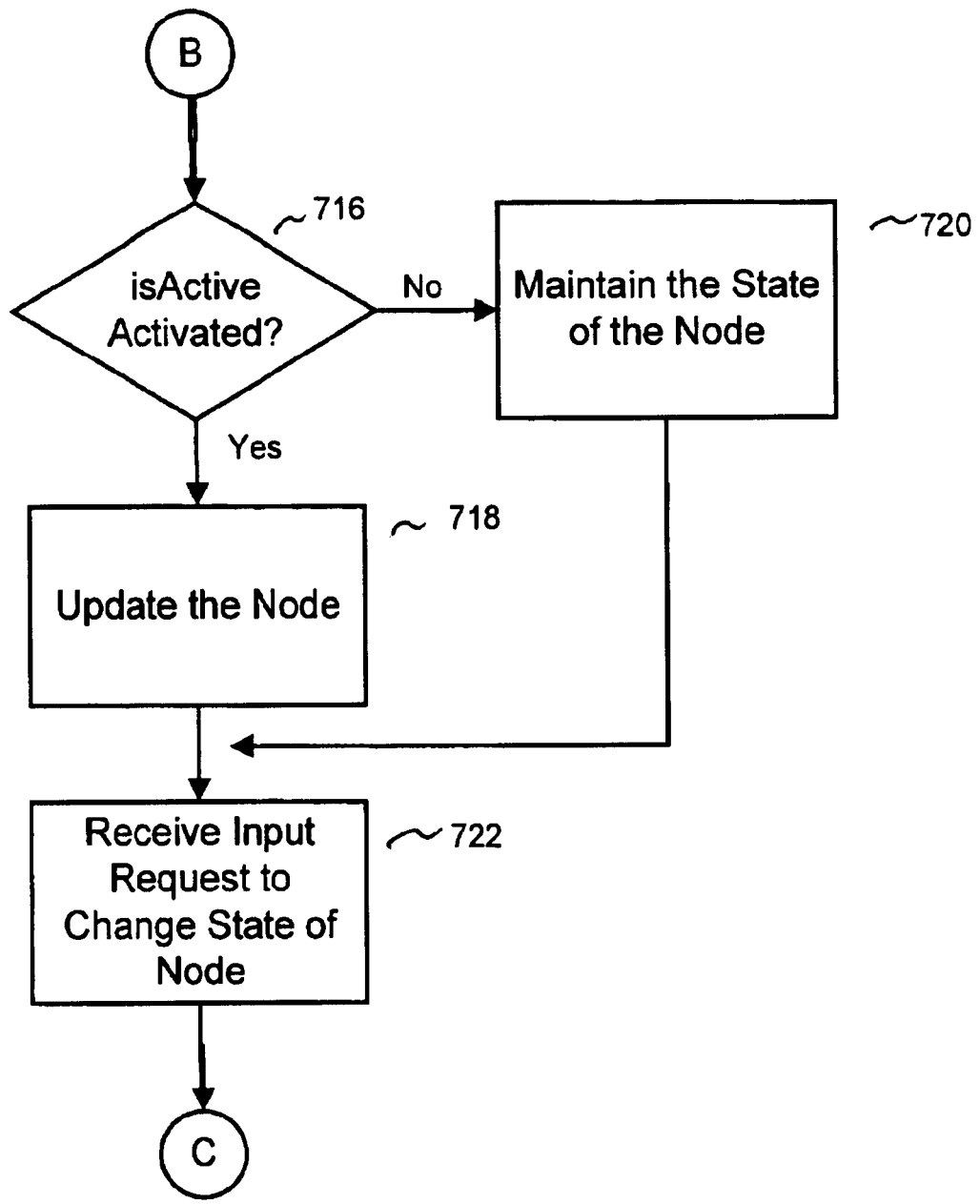
Figure 7D:
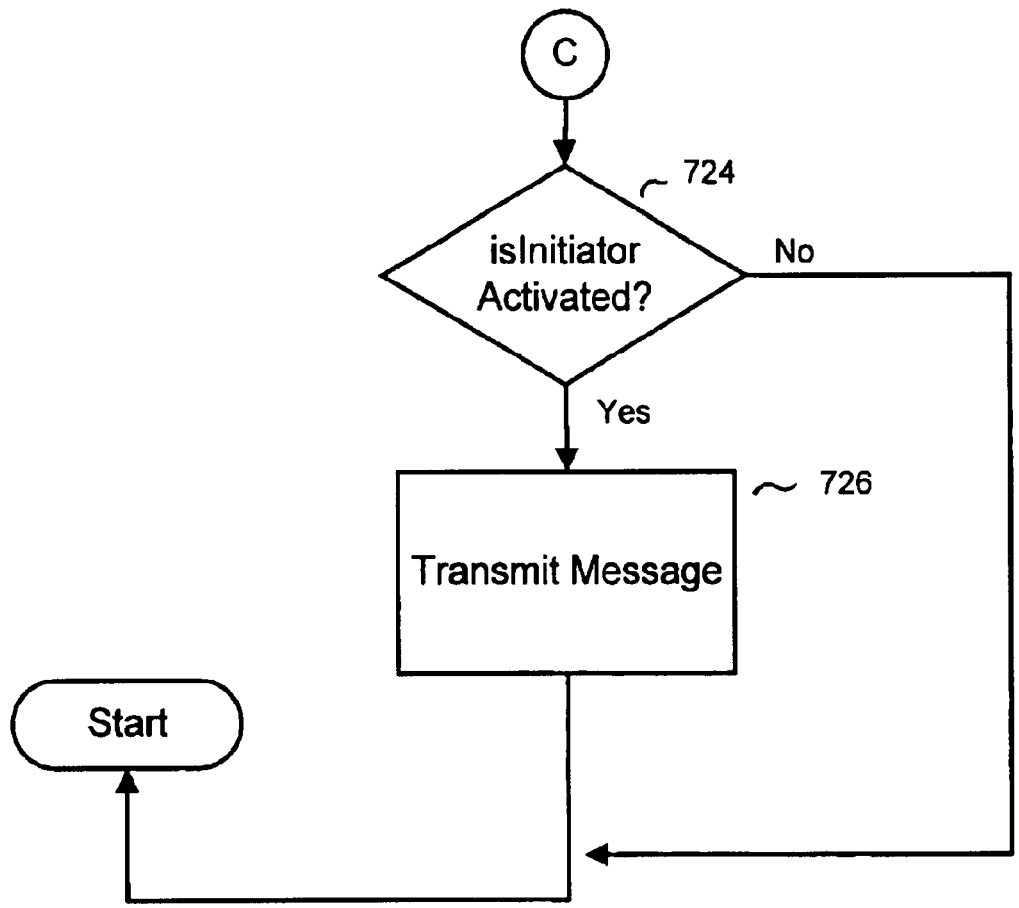

As set forth above, multi-user group nodes MultiUser-Group and MultiUserGroup 2D include four binary flag fields isInitiator, isActive, isPrivate, and isAccessible to facilitate multi-user functionality. The computer instructions set forth above employ these flag fields in a method consistent with the present invention, as set forth in FIGS. 7D—7D. First, a multi-user group node is received over network 170 by computer 110 (stage 702). In stage 704, an input request is received by the computer to access the node. In stage 706, it is determined whether a first control parameter, isAccessible is activated. If so, the node is accessed, as shown in stage 708. If the parameter isAccessible is not activated, access to the node is denied (stage 709).

Next, an input request is received to modify the node at stage 710. If a second control parameter, the flag isPrivate is not activated (stage711), computer 110 executes the input request and modifies the node (stage 712). If the flag isPrivate is activated, modification of the node is prevented (stage 713). At stage 714, a message is received over network 170 indicating a change of state for the node. Flag isActive is checked (stage 716) and, if activated, the node is updated by implementing the received state change (stage 718). If the field is not activated, then the existing state of the node is maintained (stage 720).

At stage 722, an input is received causing a change of state to the node. Next, the field isinitiator is checked (stage 724). If isinitiator is activated, computer 110 transmits a message over network 170 containing the received state change of the node over network 170 to other computers (stage 726). If isinitiator is not activated, no message is transmitted and the over network 170 containing the received state change is not sent to other computers. As described in detail above, methods and apparatus consistent with the invention provide a multimedia player implementing multi-user interactive communication over a computer system. The foregoing description of an implementation of the invention has been presented for purposes of illustration and description. Modifications and variations are possible in light of the above teachings or may be acquired from practicing the invention. For example, the foregoing description is based on extensions to MPEG-4 or VRML scene descriptions and nodes, but those skilled in the art will recognize that other programming environments (e.g., other object-based scene descriptions) may be used consistent with the invention. Furthermore, the foregoing description is based on a client-server architecture, but those skilled in the art will recognize that a peer-to-peer architecture may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A method for implementing multi-user interaction comprising:
   dividing an overall scene into a shared scene and an unshared scene;
   receiving a multi-user group node for each of a plurality of devices wherein the multi-user group node is an object configured to represent the shared scene and viewable through the plurality of devices;
   selectively modifying the multi-user group node within a particular device in response to input from the particular device and a permission to modify the multi-user group node and forming a modified multi-user group node having a modified shared scene;
   propagating the modified multi-user group node to the plurality of devices; and
   displaying the modified shared scene on the plurality of devices through the modified multi-user group node.

2. The method according to claim 1 further comprising distributing the multi-user group node over the plurality of devices.

3. The method according to claim 1 wherein the plurality of devices corresponds to a plurality of users.

4. The method according to claim 1 comprising selectively denying one of the plurality of devices access to the shared scene corresponding to the multi-user group node.

5. The method according to claim 1 further comprising selectively denying one of the plurality of devices access to the modified shared scene corresponding to the modified multi-user group node.

6. The method according to claim 1 wherein the multi-user group node comprises an extension to a VRML group node.

7. The method according to claim 1 wherein the multi-user group node comprises an extension to an MPEG-4 group node.

8. The method according to claim 1 wherein modifying the multi-user group node further comprises checking for the permission to modify the multi-user group node.

9. The method according to claim 1 further comprising displaying the shared scene on the plurality of devices through the multi-user group node.

10. An apparatus for implementing multi-user interaction comprising:

at least one memory device having program instructions, and at least one processor configured to use the program instructions to perform the operations of:

dividing an overall scene into a shared scene and an unshared scene;

receiving a multi-user group node for each of a plurality of devices wherein the multi-user group node is an object configured to represent the shared scene and viewable through the plurality of devices;

displaying the shared scene on the plurality of devices through the multi-user group node;

selectively modifying the multi-user group node within a particular device in response to input from the particular device and a permission to modify the multi-user group node and forming a modified multi-user group node having a modified shared scene;

propagating the modified multi-user group node within the particular device to the plurality of devices; and displaying the modified shared scene on the plurality of devices through the modified multi-user group node.

11. A computer readable medium containing instructions for controlling a computer system to perform a method of implementing multi-user interaction, comprising:

dividing an overall scene into a shared scene and an unshared scene;

receiving a multi-user group node for each of a plurality of devices wherein the multi-user group node is an object configured to represent the shared scene and viewable through the plurality of devices;

displaying the shared scene on the plurality of devices through the multi-user group node;

selectively modifying the multi-user group node within a particular device in response to input from the particular device and a permission to modify the multi-user group node and forming a modified multi-user group node having a modified shared scene;

propagating the modified multi-user group node within the particular device to the plurality of devices; and displaying the modified shared scene on the plurality of devices through the modified multi-user group node.

12. An apparatus for implementing multi-user interaction, comprising:

means for dividing an overall scene into a shared scene and an unshared scene;

means for receiving a multi-user group node for each of a plurality of devices wherein the multi-user group node is an object configured to represent the shared scene and viewable through the plurality of devices;

means for displaying the shared scene on the plurality of devices through the multi-user group node;

means for selectively modifying the multi-user group node within a particular device in response to input from the particular device and a permission to modify the multi-user group node and forming a modified multi-user group node having a modified shared scene;

means for propagating the modified multi-user group node within the particular device to the plurality of devices; and means for displaying the modified shared scene on the plurality of devices through the modified multi-user group node.

* * * * *